United States Patent Office 3,160,786
Patented Dec. 8, 1964

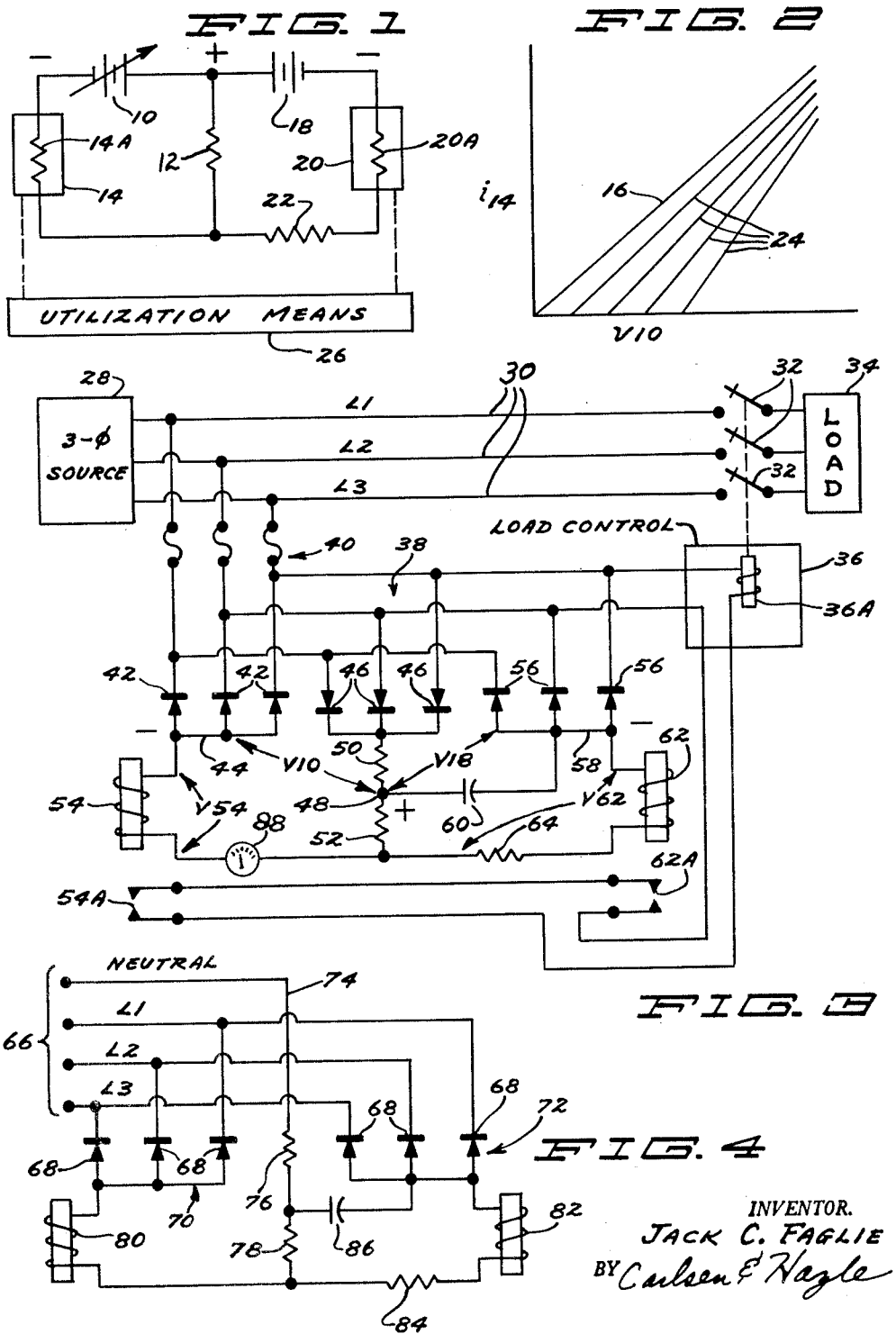

3,160,786
POLYPHASE VOLTAGE BALANCE DETECTOR
Jack C. Faglie, San Antonio, Tex., assignor, by direct and mesne assignments, to Electric Products Engineering Corp.
Filed Nov. 23, 1959, Ser. No. 854,756
6 Claims. (Cl. 317—27)

This invention relates to electroresponsive systems and more particularly to self-checking voltage differential and polyphase voltage unbalance detecting systems and method for same.

This invention is particularly useful in connection with polyphase electric motors and the like for automatically disconnecting the motor from the polyphase power source in the event of phase failure and to automatically restart the motor upon restoration of the phase. Such failure may consist of, for example, an open circuit in one phase conductor, a grounded phase conductor or a phase-to-phase short circuit.

In a three-phase three-wire system upon failure of one of the phases only one phase will effectively remain. This is commonly called "single phasing" and results in a severe overload of the remaining phase and can cause damage to loaded electric motors connected thereto.

One important feature of the present invention is that the detectors are self-checking and will automatically disconnect the load or motor whenever a detector or a phase failure occurs. The self-checking feature is combined with a system arrangement whereby a change in one phase voltage due to some complete or partial failure is amplified in degree, that is a 15% line voltage change is amplified to a 48.9% change, for example, across the voltage sensitive detector component. Therefore voltage adjustments in the component are not critical.

It may therefore be seen that the present invention is concerned with a method and apparatus which is new and novel in the field concerning the indication and detection of the operation of electrical polyphase alternating current circuits. One embodiment of my invention may be utilized to provide a control signal to automatically disconnect a polyphase load upon an unbalance arising between any of the individual phase alternating voltages or currents. Embodiment is also presented which serves to provide a control signal upon the undesirable condition of operation below a predetermined voltage in the system even though the individual phase voltages may be balanced. My invention may also be utilized to provide a control signal usable for disconnecting electrical loads upon a phase unbalance consisting either of a reduction in voltage in one or more of the phases or an increase in the voltage in one or more of the phases. As will be seen, in the appended specification and drawing, my invention provides highly efficient operation through the use of minimum number of components which, of course, provides for a higher degree of reliability while providing a substantial reduction in investment higher, more versatile protection and indication to a user in the supervision of the operation of polyphase electrical equipment.

Accordingly it is an object of the present invention to provide detection of a differential between two voltages wherein the degree of voltage change in a sensing component due to changes in one of the voltages is amplified in degree by current provided by the other voltage.

It is another object of the present invention to provide an electroresponsive system being sensitive to a differential between two voltages with the sensitivity varying with the relative voltage magnitudes.

It is a further object of the present invention to provide a self-checking voltage change detecting system wherein a current provided by one voltage accentuates the degree of voltage change in the sensing component and provides indication that the detector is properly accentuating said change.

It is a still further object of the present invention to provide a polyphase electroresponsive system developing two polyphase system derived voltages, one of which is regulated, and having means for detecting a change in the voltage differential between said voltages for indicating phase failure.

It is still another object of this invention to provide indication of phase voltage balance by sensing for the minimum voltage difference between a filtered rectified and an unfiltered rectified polyphase voltages.

These and other more detailed and specific objects will be disclosed in the course of the following specification, reference being had to the accompanying drawing, in which—

FIG. 1 is a simplified circuit diagram illustrating the operation of an exemplary embodiment of the present invention.

FIG. 2 is a graphical illustration of the FIG. 1 circuit operation as a degree of voltage change amplifier.

FIG. 3 illustrates an exemplary polyphase electroresponsive system embodying the present invention.

FIG. 4 shows an alternate embodiment of this invention using half-wave rectification.

With more particular reference now to the accompanying drawing there is a variable voltage battery 10 connected in series circuit with an impedance 12 and a voltage sensitive device 14 having an internal impedance 14A. The voltage appearing across impedance 14A for actuating device 14 is a function of the current flowing in the series loop and varies linearly with the voltage of battery 10 as indicated by line 16 of FIG. 2. For a ten percent change in battery 10 voltage, the voltage across impedance 14A changes a like percentage amount.

The percentage voltage change across impedance 14A may be increased by connecting the series loop including reference constant-voltage battery 18, and the impedances 20A and 22 across the impedance 12. Now both batteries 10 and 18 provide current through the impedance 12 with the respective currents through each battery being in part limited by the other battery provided current through the impedance 12. The limiting effect is determined by the size of the impedance 12 and the relative magnitudes of the two battery currents. The degree of percentage change amplification is easily explained in that as the battery 10 voltage decreases there is less current 14 provided through the impedances 12 and 14A. The reduced current permits an increase in the battery 18 current, resulting in maintaining a voltage drop across the impedance 12 which is proportionately increasingly due to the battery 18. As a result the battery 10 current decreases at a greater rate than its voltage $V_{10}$, providing a greater degree change of voltage across the impedance 14A. As the impedance 12 is increased the effect is more pronounced as indicated by the FIG. 2 lines 24 slopes wherein the rightmost line indicates the largest impedance value. The slopes of the lines 24 are indicative of the change in battery 10 current in relation to change in battery 10 voltage; any line 24 having a gradient larger than the line 16 slope indicating a proportionate greater current change than voltage change, thus a greater degree of voltage change across impedance 14a.

An example of circuit operation is illustrated in the table below wherein the circuit battery voltages were nominally 100 and 150 volts, and the impedances of each circuit leg (14A, 12, and 22 plus 20A) was 10,000 ohms.

TABLE I

| V18 Volts | V10 Volts | V10 Change, Percent | V14A Volts | V14A Change, Percent |
|---|---|---|---|---|
| 100 | 100 | 0 | 33⅓ | 0 |
| 100 | 90 | −10 | 26⅔ | −20 |
| 100 | 80 | −20 | 20 | −40 |
| 100 | 50 | −50 | 0 | −100 |
| 150 | 100 | 0 | 13⅓ | 0 |
| 150 | 90 | −10 | 10 | −25 |
| 150 | 80 | −20 | 3⅓ | −75 |
| 150 | 75 | −25 | 0 | −100 |

The above table further shows that for a given set of circuit impedances, the relative magnitudes of the two voltages varies the rate at which the impedance 14A voltage changes with respect to the initial value or 0% change. Accordingly there is provided apparatus in which the sensitivity to voltage change may be varied by varying the magnitudes of the voltages to be compared. One advantage of the above arrangement is that it is easier to consistently detect a small voltage change which is a relatively large portion of the initial voltage, than it is to consistently detect a slightly larger voltage change which is a greatly less proportionate amount of the initial voltage.

The circuit operation is also varied by changing the resistance of the impedance 12, for example increasing same to 20,000 ohms the following operation is provided:

TABLE II

| V18 Volts | V10 Volts | V10 Change, Percent | V14A Volts | V14A Change, Percent |
|---|---|---|---|---|
| 100 | 100 | 0 | 33⅓ | 0 |
| 100 | 90 | −10 | 26⅔ | −20 |
| 100 | 80 | −20 | 20 | −40 |
| 100 | 50 | −50 | 0 | −100 |
| 110 | 100 | 0 | 13⅓ | 0 |
| 110 | 90 | −10 | 10 | −25 |
| 110 | 80 | −20 | 3⅓ | −75 |
| 110 | 75 | −25 | 0 | −100 |

The impedance 20A may be the internal impedance of a voltage responsive means 20 inserted into the circuit for detecting a decrease or absence of voltage and current from battery 18. By providing indications to suitable utilization means 26 from the voltage responsive means 14 and 20 in conjunctive controlling relation, as will become apparent, the FIG. 1 circuit provides indications that battery 10 voltage differs from battery 18 voltage by a predetermined amount or that the detector circuit as illustrated is not functioning properly. Detector failure in the battery 18 loop removes or materially decreases the voltage across the means 20 while failure in the battery 10 loop causes removal of or a material decrease in voltage across the means 14.

Further the circuit is responsive to battery 18 providing increased voltage over battery 10. As the battery 18 voltage is increased the battery 10 provided current decreases due to the increased battery 18 provided current through the impedance 12. By calibrating the voltage responsive means 14 to activate at a predetermined voltage increase of the battery 18 over the battery 10 voltage a high-low voltage detector indicator is provided which is especially useful in a polyphase system as will become apparent.

Referring now to FIG. 3 a three-phase three-wire power source 28 provides three-phase power over phase conductors 30 through the usual load disconnect switches 32 to a load 34, such as an electric motor. The usual load control or motor starter 36 includes a coil 36A for electromagnetically controlling the switches 32 as will become apparent. The invention resides in the polyphase phase failure detector 38 which is connected to each conductor 30 and is suitably fused as at 40. The three rectifiers 42 have their respective cathode ends electrically connected to the phase conductors 30 and the anode ends all joined and connected to junction 48. A set of three rectifiers 46 is provided with the respective anode ends electrically connected to the phase conductors 30 and with the cathode ends all connected to the junction 48 through a small surge limiting resistance 50. The first current loop is completed by resistance 52, corresponding to resistance 12 of FIG. 1, and the relay coil 54 having the normally open contacts 54A. A voltage V10 is developed by full-wave rectification provided by the rectifying means 42–46. The rectified voltage is proportioned to the alternating current voltage appearing on the phase conductors 30 and will vary when any one phase voltage from source 28 varies.

The rectifiers 56 have their cathode ends respectively connected to the phase conductors 30 and the anode ends all joined and connected to junction 58 for providing a negative voltage thereon with respect to junction 48. A suitable filter capacitor 60 is connected between the junctions 48 and 58 for providing a filtered voltage V18 which is considerably less subject to decreasing voltage variations on one phase conductor 30 than is the retified voltage V10. For the purposes of detecting single phasing in a polyphase electrical system the voltage V18 acts as a regulated voltage. The voltage V18 provides current through a second circuit 38 loop including the relay coil 62 and the resistance 64.

Normally the circuit 38 is providing sufficient voltage across the relays to energize same, closing their respective contacts 54A and 62A. The resistances 52 and 64 were chosen to provide relay 54 drop out when one of the phase voltages from 28 drops from another phase voltage by 15%. The relay 62 drops out when the voltage V18 drops below a predetermined value to indicate faulty detector operation. In testing the FIG. 3 circuit the following results were obtained from a 15% single phase voltage drop in a 240 volt three-phase three-wire system using a 40,000 ohm resistor 52, a 5,600 ohm resistor 64, two relays and a capacitor:

TABLE III

| | Volts | | Change, percent |
|---|---|---|---|
| | Normal | Reduced | |
| V10 | 312 | 275 | −11.8 |
| V18 | 325 | 317 | −2.4 |
| V54 | 21.5 | 11.0 | −48.9 |
| V62 | 34.5 | 50.0 | +45.0 |

It is appreciated that by varying the components and using half-wave rectification the voltage actuation points may be varied to meet the problem at hand.

The series connected contacts 54A and 62A are in conjunctive controlling relation to the control 36 which receives its power from any one of the power phases between any two conductors 30. Both the relays must be energized to permit the load 34 to receive power. The relay 62 is adjusted to drop out when V62 drops, for example due to opening of the capacitor 60. The self-checking is made complete by requiring that relay 54 be energized to permit the switches 32 to close. Failure in the loop including that relay will necessarily drop it out, removing the power.

The voltage V18 increases at a greater rate than the voltage V10 due to the capacitor 60 tending to charge to peak rectified voltages while the voltage V10 tends to be an average between the rectified voltage peaks. Accordingly during overvoltage on a single phase the voltage V18 increases at a substantially greater rate than V10. As herein explained a voltage differential between V18 and V10 causes a decrease in the relay 54 current and voltage. The relay 54 will thus drop out to open the contacts 54A whenever a phase has a predetermined overvoltage as well as a predetermined undervoltage.

The relay coil 54 current amplitude is maximum when the phase voltages are balanced. As above noted the rectified voltage V18 is always of greater amplitude than the rectified voltage V10 with the voltage different being accentuated by phase voltage unbalance. That is, as a phase voltage decreases the voltage V10 decreases at a greater rate while when a phase voltage increases the voltage V18 increases at a greater rate. In other words the voltages V18 and V10 are at the smallest amplitude differential during phase voltage balance. It is during this voltage condition, as afore explained for the FIG. 1 circuit, that the maximum current is provided from the voltage V10. Variations of the circuit impedances serve only to change what the amplitude of the current through the relay 54 is and do not change when the maximum current occurs. This is the voltage difference bewteen V18 and V10 at which any change in one phase voltage amplitude causes the rectified voltage differential to change in one direction, i.e., increases in the illustrated embodiments.

A further modification of the present invention is provided by inserting a galvanometer 88 in series circuit with the relay 54 coil impedance, such as shown in FIG. 3. The rectifiers 42 provided current flows through the galvanometer 88 providing a phase voltage balanced condition indication at maximum current amplitude. This corresponds to minimum rectified voltage differential between V10 and V18. Decreasing current amplitudes in the galvanometer 88 indicate increasing degrees of voltage unbalance. By suitably calibrating the galvanometer 88 a direct reading phase voltage unbalance indicator is provided for one amplitude of phase voltages.

In one circuit embodying the galvanometer modification of this invention and wherein a 5,000 ohm impedance was substituted for the relay 54 coil impedance, the resistance 50 was ten ohms, the resistance 64 and relay coil 62 impedance were combined in a 5,000 ohm resistor and the capacitor 60 was a two microfarad capacitor. It is understood that the modification works in combination with the relays 54 and 62 as well as with resistive impedances. Further by varying the various impedances the maximum current amplitude through the galvanometer 88 is varied with the maximums all occurring at phase voltage balanced conditions.

In testing the above described circuit one phase voltage was dropped fifteen percent below the other two phase voltages in a three-phase system. The fifteen percent drop caused a decrease in current of sixty percent through the galvanometer 88. This change was amplified only for a phase unbalance. When all phase voltages changed together the galvanometer current change was linearly directly proportional to the phase voltage change. Therefore when using the modified FIG. 3 circuit for direct indication of phase voltage unbalance the galvanometer should be calibrated for the normal line voltages. This may be done by any of the usual methods of galvanometer calibration as are well known. However, for merely indicating phase balance the galvanometer maximum current indication without calibration is sufficient.

The galvanometer 88 may be of the type having a small current amplitude range since the described circuit has been found particularly useful with checking the operation of a polyphase system supplying a polyphase electric motor. It is well known that a single phase fault involving a polyphase motor results in only relatively slight single phase voltage changes, for example a voltage drop of seventeen percent on the faulted phase conductor.

An alternate embodiment utilizing half-wave rectified three-phase power is shown in FIG. 4. A four-wire three-phase system 66, such as Y or star-connected polyphase systems, has each phase conductor respectively connected to the cathode ends of two rectifiers 68, one of which is in rectifier set 70 and the other in set 72. The anode ends of each set are respectively connected together for providing negative half-wave rectified voltages with respect to the neutral conductor 74 through a surge limiting resistance 76. Resistance 78 corresponds to resistance 12 of FIG. 1, while the unfiltered polyphase derived voltage V10 (half-wave) is developed across the relay 80 and resistance 78. Similarly voltage V18 (half-wave) is developed across the relay 82 and resistance 84 corresponding, respectively, to the means 20 and resistor 22 of FIG. 1. The capacitor 86 is added as shown to filter voltage V18. Circuit operation is identical to the FIG. 3 circuit operation save for differences in voltage and current amplitudes. Contacts may be actuated in the same manner for controlling a load, such as illustrated in FIG. 3, and the galvanometer 88 may be also used.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An electroresponsive system for detecting a predetermined voltage change between electrical conductors, comprising first and second rectifiers respectively connected to the conductors for rectifying like polarity voltages therefrom, a first impedance, a first relay coil connected between the first rectifier and a first impedance one end, a second relay coil having one end connected to the second rectifier, a second impedance connected between the second coil other end and the said first impedance one end, circuit means electrically associated with the conductors for completing an electrical circuit therewith and being connected to the first impedance other end, and a capacitor connected between the circuit means and the second rectifier for minimizing rectified voltage change therebetween as the conductor voltage decreases.

2. A self-checking electroresponsive circuit for detecting a predetermined voltage difference between any two conductors in a polyphase electrical system, comprising first and second voltage responsive means, first, second and third sets of rectifiers with the rectifiers in each set for conducting unidirectional currents in the same direction between one and the other rectifier ends, the one ends of all rectifiers in the first and third sets for being respectively connected to the electrical conductors in a polyphase system to be checked and the rectifier other ends in each set being respectively electrically connected to the first and second responsive means, the second set having its rectifier other ends being respectively connected to the other rectifier sets said one ends and the second set one ends being joined, an interacting circuit component having one end connected to said second set joined one ends and with the other end connected to both the first and second responsive means at their respective ends opposite the said first and third rectifier connections, a capacitor connected between the second and third rectifier sets for providing an increase in voltage differential between the first and third rectifier sets with increasing phase voltage unbalance in the polyphase electrical system whereby the corresponding decrease in current through the first responsive means is amplified in degree, and the second responsive means being responsive to a predetermined decrease in the third rectifier set current to indicate circuit failure.

3. Apparatus as in the claim 2 wherein the responsive means comprise electromagnetic relays with normally open series connected contact means, and the relays being responsive to voltage decreases thereacross for opening said contact means to indicate either a phase fault or electroresponsive system fault.

4. Apparatus as in claim 2 wherein the capacitor is connected through a surge limiting resistance between the second set rectifier one ends and the third set rectifier other ends.

5. Apparatus as in the claim 3 wherein the capacitor is connected through a surge limiting resistance between the second set rectifier one ends and the third set rectifier other ends.

6. A self-checking electroresponsive system for detecting a predetermined voltage change on one of a plurality of electrical phase conductors in a polyphase electrical system having a grounded neutral conductor, comprising first and second relays with normally open series connected contacts, first and second rectifier sets with each set having one of each rectifier ends respectively connected to the phase conductors and the rectifier other ends joined, a capacitor connected between the second rectifier set other ends and the neutral conductor through surge limiting means, a common impedance having one end connected to neutral conductor side of the capacitor and the other end connected to one end of the first relay, the first relay other end being connected to the first rectifier other ends, a second impedance connected between the common impedance other end and to one end of the second relay, the second relay other end being connected to the second set other ends for making the second relay sense a predetermined voltage drop between the said second set and the neutral conductor, and the first relay being responsive to open its contacts when the voltage difference between the first and second rectifier other ends exceeds a predetermined amplitude for indicating a lesser degree voltage change on one of the phase conductors.

References Cited in the file of this patent

UNITED STATES PATENTS

| | | |
|---|---|---|
| 2,343,423 | Reagan | Mar. 7, 1944 |
| 2,735,962 | Ellis et al. | Feb. 21, 1956 |
| 2,914,704 | Nesler | Nov. 24, 1959 |
| 2,920,242 | Koss | Jan. 5, 1960 |
| 2,940,033 | McConnell | June 7, 1960 |
| 2,981,867 | Hopkins | Apr. 25, 1961 |

FOREIGN PATENTS

| | | |
|---|---|---|
| 742,263 | Germany | Nov. 26, 1943 |